United States Patent [19]

Cotton et al.

[11] Patent Number: 4,860,809
[45] Date of Patent: Aug. 29, 1989

[54] DEVICE FOR AND METHOD OF PRODUCING WORKPIECES WITH ALTERNATING CONTOUR MATING SURFACES

[75] Inventors: Lawrence M. Cotton; Gery R. Compton, both of New Bern, N.C.

[73] Assignee: Robert Bosch Power Tool Corporation, New Bern, N.C.

[21] Appl. No.: 249,852

[22] Filed: Sep. 27, 1988

[51] Int. Cl.⁴ .................. B27C 5/10; B27C 1/12
[52] U.S. Cl. .................. 144/371; 144/134 D; 144/137; 144/144 R; 144/253 R
[58] Field of Search .......... 144/134 R, 134 D, 136 R, 144/136 C, 137, 144 R, 90 R, 90 A, 253 R, 371, 372; 409/182

[56] References Cited

U.S. PATENT DOCUMENTS

| | | | |
|---|---|---|---|
| 3,119,207 | 1/1964 | Nall | 144/134 D |
| 3,943,985 | 3/1976 | Wowczyk | 144/144 R |
| 4,024,898 | 5/1977 | Bergler et al. | 144/136 C |
| 4,044,805 | 8/1977 | Gronholz | 144/136 C |
| 4,768,570 | 9/1988 | Honeyman | 144/137 |

*Primary Examiner*—W. Donald Bray
*Attorney, Agent, or Firm*—Michael J. Striker

[57] ABSTRACT

Alternating contour mating surfaces on two workpieces are produced by a working tool, for example a router bit of a router, by rotating the working tool and displacing it relative to the workpieces with guidance of the tool by a base member which has a first substantially flat surface and a second surface which is spaced transversely from the first surface and has two surface portions offset relative to one another in a transverse direction.

12 Claims, 6 Drawing Sheets

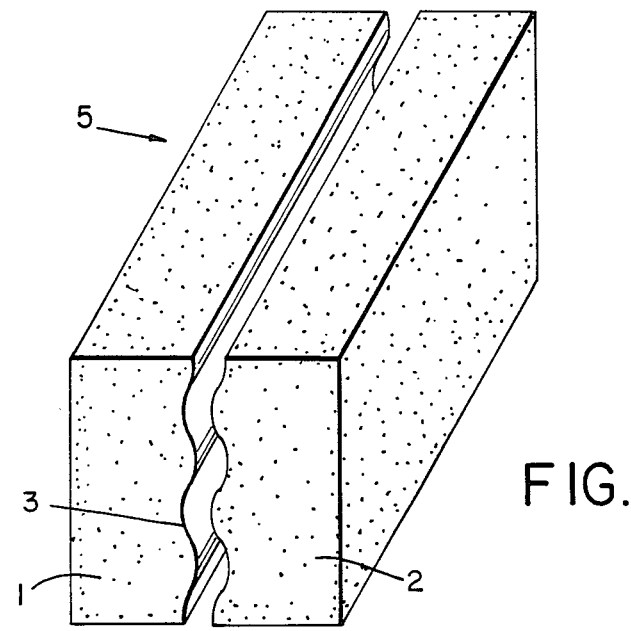
FIG. 1
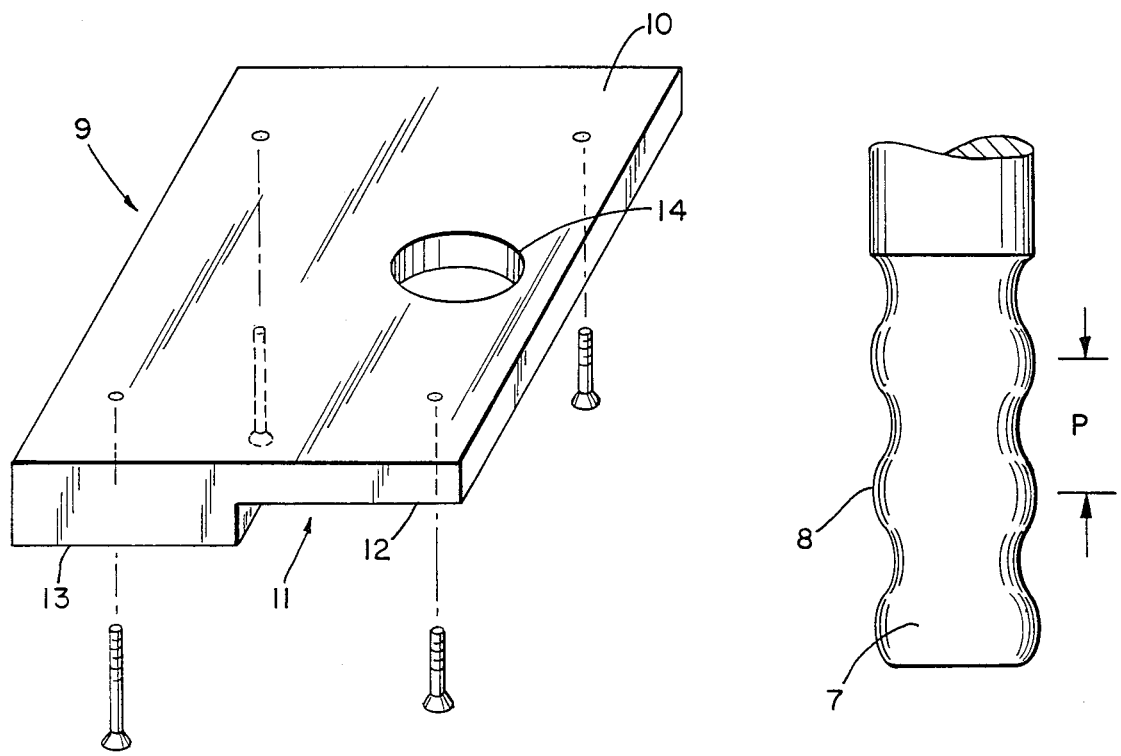
FIG. 2
FIG. 2A

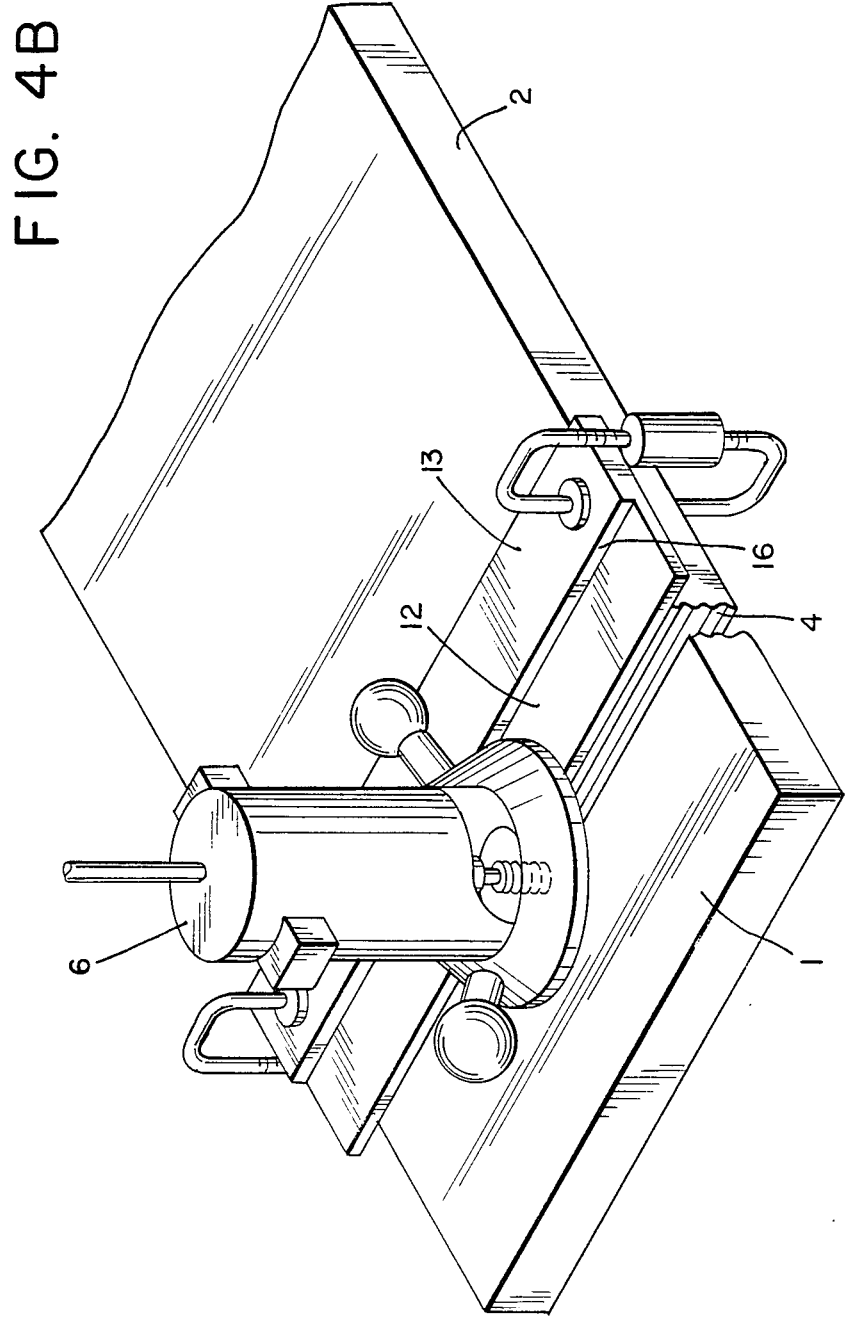

4,860,809

DEVICE FOR AND METHOD OF PRODUCING WORKPIECES WITH ALTERNATING CONTOUR MATING SURFACES

BACKGROUND OF THE INVENTION

The present invention relates to a device for and a method of producing workpieces with alternating contour mating surfaces.

Devices and methods of the above mentioned general type are known in the art. Alternating contour mating surfaces are produced on workpieces for connecting them with one another along the alternating contour surfaces so as to form a strong form-locking joint. For producing such alternating contour mating surfaces, routers with router bits are used. For producing two workpieces with respective two alternating contour mating surfaces, first one workpiece is worked with a router bit to form its alternating contour surface. Then, the power tool has to be reset and the alternating contour surface on the second workpiece is formed. It is to be understood that the resetting of the router bit is an undesirable time and labor consuming operation, and it would be of advantage to produce the above mentioned workpieces without resetting of the router bit. Moreover, if the amount a bit protrudes during the operation is not exact, or in other words, the bit is not at a vertically tangent point to one of the curved surfaces with alternating contour, the routed surface could have a brittle feathered edge mating surfaces.

SUMMARY OF THE INVENTION

Accordingly, it is an object of the present invention to provide a device for and a method of producing two workpieces with alternating contour mating surfaces, which eliminate the disadvantages of the prior art.

More particularly it is an object of the present invention to provide a device for and a method of producing workpieces with alternating contour mating surfaces, which do not require resetting of a router bit in a router.

In keeping with these objects and with others which will become apparent hereinafter, one feature of the present invention resides in a device for and a method of producing workpieces with alternating contour mating surfaces in accordance with which a router with a rotatable router bit having a alternating contour working surface which corresponds to alternating contour surfaces of workpieces is used, and a base member is utilized which has one substantially flat surface and another opposite surface with first and second surface portions which are offset relative to one another. When the router with the router bit is placed onto the one flat surface, the alternating contour mating surfaces on two workpieces can be produced by placing the workpieces successively on one surface portion and on the other surface portion of the other surface of the base member. On the other hand, the router bit can be placed on one surface portion and then on the other surface portion of the other surface of the base member, while both workpieces can be placed on the one flat surface of the base member. In this device and with this method, two workpieces are produced with mating alternating contour surfaces without the resetting of the router bit in a router. Moreover, the chance of misalignment of the router bit is significantly reduced.

For providing the exact mating of the alternating contour surfaces, the first and second portions of the other surface of the base member can be offset relative to one another by a half pitch of the alternating contour of the mating surfaces or a multiple of the half pitch thereof.

The base member can be provided with a central opening in the region when the first and second surfaces merge into one another, so that the router bit extends through the central opening. On the other hand, the base member can be solid so that the router can be placed on the respective surface near its lateral edge so that the router bit extends laterally outwardly beyond the base member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing two workpieces with alternating contour surfaces, to be produced in accordance with the present invention and connected with one another to form a joint;

FIG. 2 is a view showing a base member for a device and a method in accordance with the present invention;

FIG. 2A is a view schematically showing a router bit of a router for producing workpieces in accordance with the present invention;

FIGS. 4a and 4b are views substantially corresponding to the views of FIGS. 3a and 3b, but showing the method of producing alternating contour surfaces on workpieces in accordance with another embodiment of the present invention.

DESCRIPTION OF THE PREFERRED EMBODIMENTS

Figure 3A:
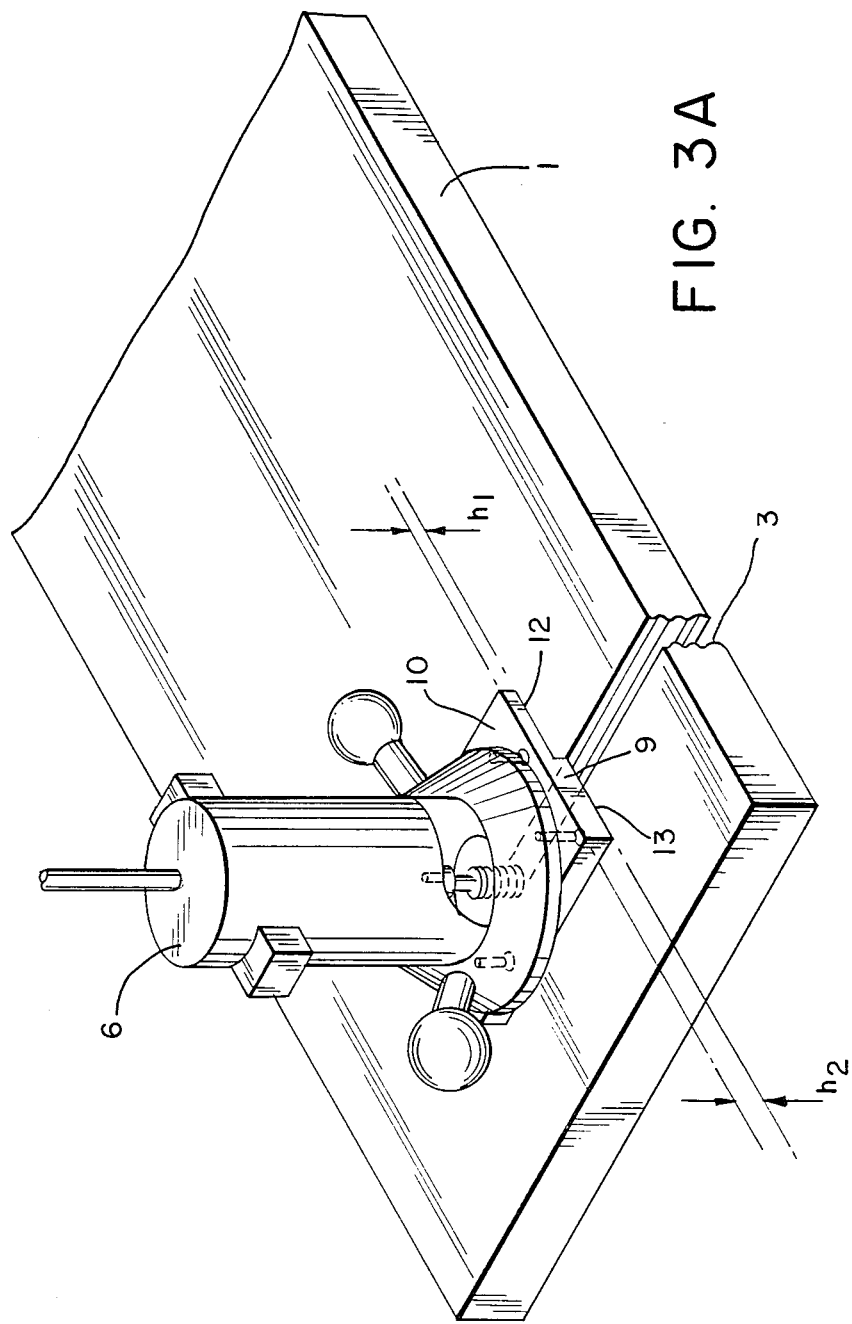
FIGS. 3a and 3b are views illustrating a method for producing alternating contour surfaces on two workpieces in accordance with one embodiment of the invention.

A device and a method in accordance with the present invention is used for producing workpieces with alternating contour mating surfaces. The workpieces are identified with reference numerals 1 and 2 in FIG. 1 and have alternating contour surfaces 3 and 4 which are formed so that they mate with one another. The workpieces 1 and 2 are connected with one another for example by introducing a binder between the alternating contour surfaces 3 and 4 and pressing the workpieces 1 and 2 toward one another so as to obtain a final product which is identified as a whole with reference numeral 5.

The alternating contour surfaces 3 and 4 on the workpieces 1 and 2 are produced by a router 6 provided with a rotatable router bit 7. The router bit has a alternating contour working surface which corresponds to the alternating contour surfaces of the workpieces. It is rotated by a not shown rotary drive provided in the router 6.

In accordance with the present invention, a base member 9 is provided, so as to be associated with the router 6 for producing the alternating contour surfaces of the workpieces. The base member 9 has one flat surface 10, and another opposite surface 11 which is provided with two surface portions 12 and 13. The surface portions 13 and 12 are offset relative to one another. This offset can be equal to a half-pitch of the surfaces 3, 4, 8 or a multiple of the half-pitch. The base member 9 can be provided with a central opening 14 for the router bit 7. However, it is also possible that the member 9 does not have a central opening as will be explained hereinbelow.

Figure 3B:
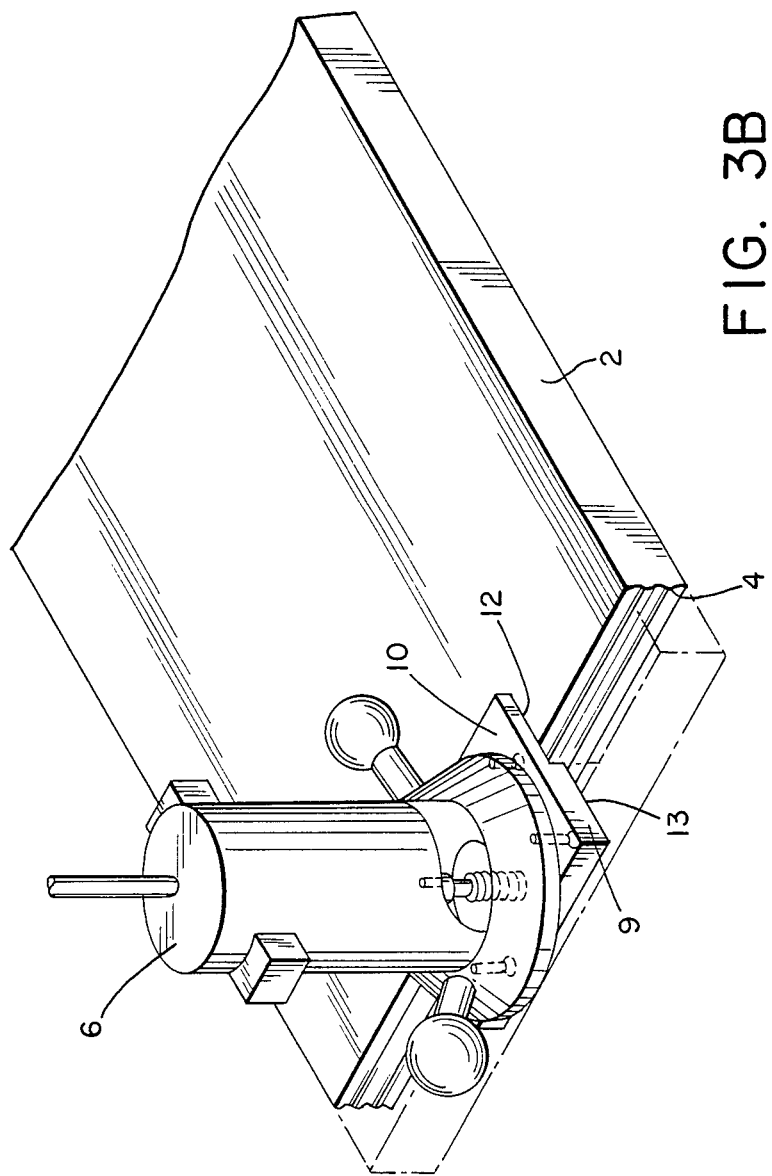

For producing alternating contour surfaces 3 and 4 on two workpieces 1 and 2 to be joined together, the router 6 is placed on the surface 10 of the base member 9 as shown in the embodiment of FIGS. 3a and 3b, wherein the base member 9 faces with its stepped surface 11 downwardly. The workpiece 1 is placed onto the surface portion 13 in abutment therewith, the base member 9 is fixed to the flange of the router 6 by screws and moved along the workpiece 1 (FIG. 3a). As a result of this, a alternating contour surface 3 is produced on the workpiece 1. Then the workpiece 2 is placed on the surface portion 12 of the surface 11 of the base member 9 in abutment therewith, the router bit 7 is rotated and the router is moved along the workpiece 2, so that a alternating contour surface 4 is produced in the latter (FIG. 3b). The routing of the workpieces 1 and 2 can be performed simultaneously or successively. The thusly produced alternating contour surfaces 3 and 4 exactly mate with one another. During their production no resetting of the router bit 7 is required.

Figure 4A:
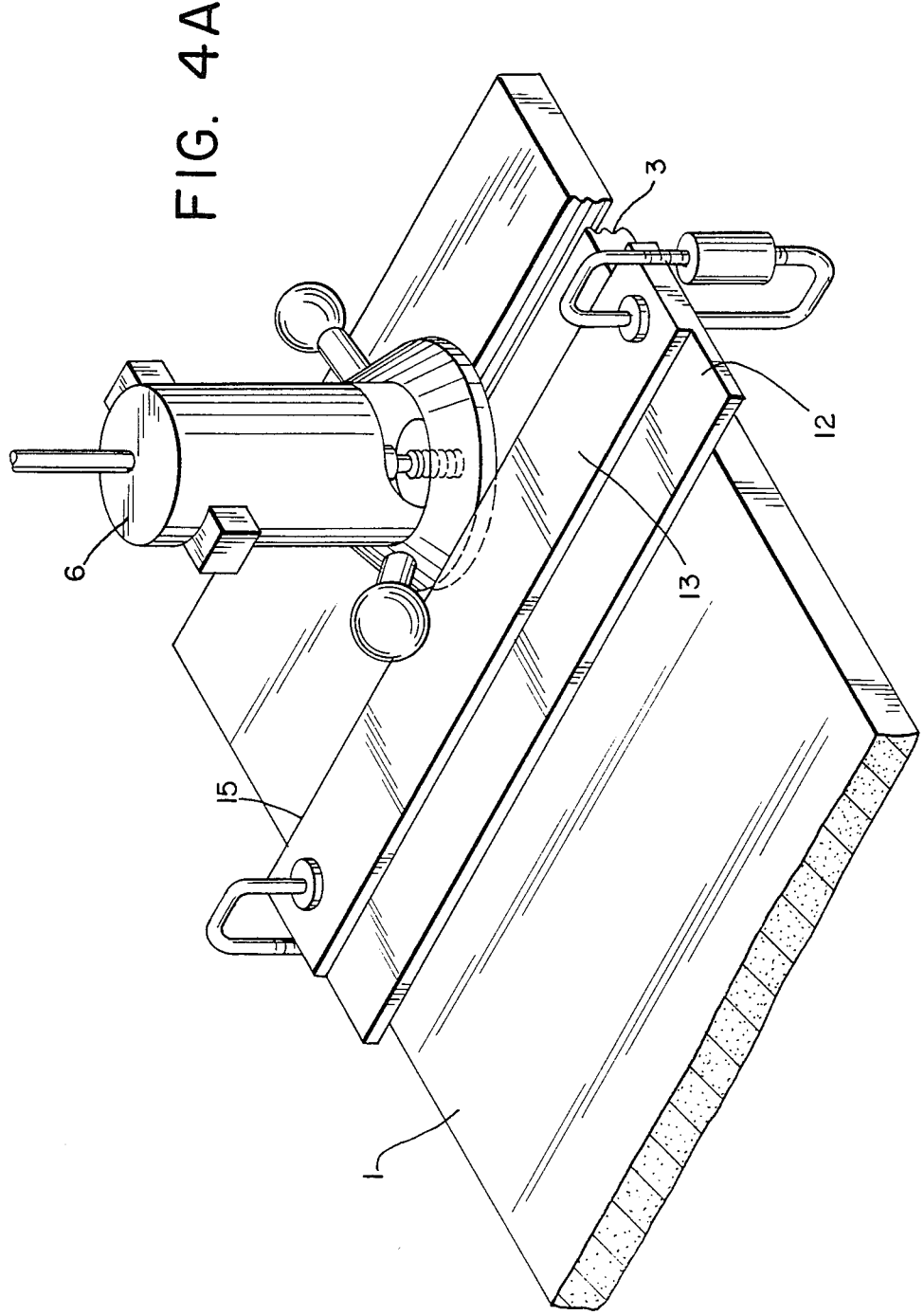

FIGS. 4a and 4b show the method of the invention in accordance with another embodiment. In this embodiment the base member 9 is turned with its surface 11 upwardly. First, as shown in FIG. 4a, the router 6 is placed on the upper surface of the workpiece 1 so that its flange laterally abuts against a side surface 15 of the lower step of the base member. Then the router bit 7 is rotated and the router is moved longitudinally along the workpiece 1 so as to cut it off from a remaining portion and to produce the alternating contour surface 3 on the workpiece 1. After this, the base member 9 is placed with its surface 10 on the workpiece 2 as shown in FIG. 4b. The router 6 is placed on surface portion 12 of the surface 11 so that it laterally abuts against a side surface 16 between the surface portions 12 and 13. The router bit 7 is rotated and the router is moved along the workpiece 2 so as to produce the alternating contour surface 4 on the latter.

In accordance with an advantageous feature of the present invention the height h1 of the lower portion of the base member 9, which is limited between the surface 10 and the surface portion 12 of the surface 11, is equal to half-pitch or to integer multiple of half pitch of the alternating contour surface 8 of the router bit 7. With such dimensioning of the base member 9, the method in accordance with the embodiment of FIGS. 4a and 4b can be performed. The difference between the height h2 of a higher portion of the base member 9 which is limited between the surface 10 and the surface portion 13 of the surface 11, and the height h1 is also equal to half pitch or integer multiple of half pitch of the alternating contour surface 8 of the router bit 7. With the latter mentioned dimensioning, the method in accordance with the embodiment of FIGS. 3a and 3b can be performed.

Figure 5:
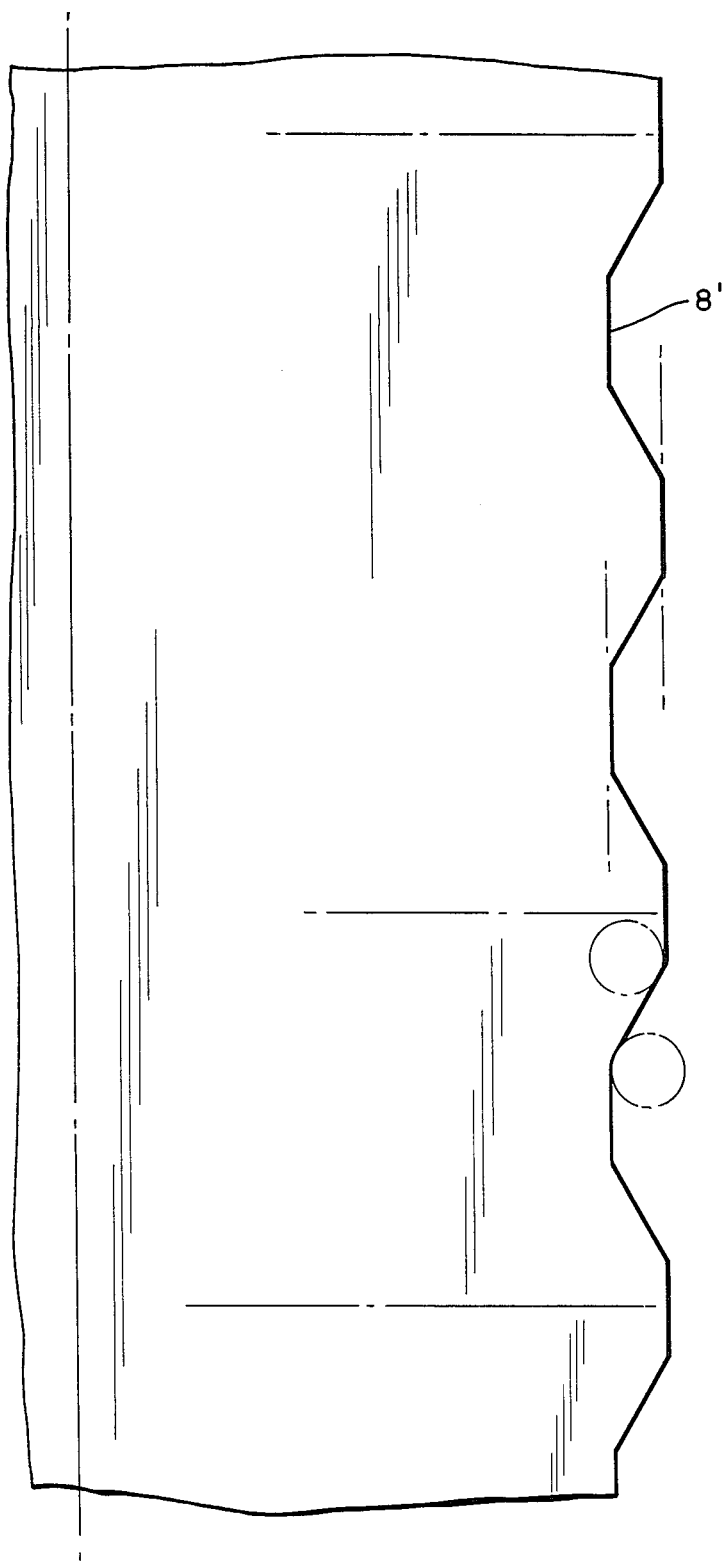
FIG. 5 is a view showing alternative configuration of workpieces and router bits for their manufacture.

The surface of the router but can be formed somewhat differently for example as shown in FIG. 5 with a surface 8' including alternating conical and circular cylindrical portions.

It will be understood that each of the elements described above, or two or more together, may also find a useful application in other types of construction differing from the types described above.

While the invention has been illustrated and described as embodied in a device for producing mating alternating contour surfaces in workpieces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for producing mating alternating contour surfaces on workpieces, comprising a rotatable and displaceable working tool with a alternating contour surface; and a base member arranged to be placed on a workpiece and to guide said tool during said displacement, said base member having a first substantially flat surface, and a second opposite surface transversely spaced from said first surface and provided with two surface portions which are offset from one another in a transverse direction so that when said working tool is guided by said base member it produces two alternating contour mating surfaces on two workpieces.

2. A device as defined in claim 1, wherein said alternating contour surface of said tool has a predetermined pitch, saud surface portions of said second surface having one surface portion which is located closer to said first surface, said one surface portion being spaced from said first surface by a distance which is substantially equal to half pitch of said tool.

3. A device as defined in claim 1, wherein said alternating contour surface of said tool has a predetermined pitch, said surface portions of said second surface having one surface portion which is located closer to said first surface, said one surface portion being spaced from said first surface by a distance which is substantially equal to integer multiple of half pitch of said tool.

4. A device as defined in claim 1, wherein said alternating contour surface of said tool has a predetermined pitch, said surface portions of said second surface including one surface portion which is located closer to said first surface and another surface portion which is located farther from said first surface, said surface portions being spaced from one another by a distance which is substantially equal to half pitch of said alternating contour surface of said tool.

5. A device as defined in claim 4, wherein said alternating contour surface of said tool has a predetermined pitch, said surface portions of said second surface including one surface portion which is located closer to said first surface and another surface portion which is located farther from said first surface, said surface portions being spaced from one another by a distance which is substantially equal to integer multiple of half pitch of said alternating contour surface of said tool.

6. A device as defined in claim 2, wherein said surface portions of said second surface are spaced from one another by a distance which is substantially equal to half pitch of said alternating contour surface of said tool.

7. A device as defined in claim 3, wherein said surface portions of said second surface are spaced from one another by a distance which is substantially equal to integer multiple of half pitch of said alternating contour surface of said tool.

8. A device as defined in claim 1, wherein said tool is connected with said base member and is displaceable together with the latter; and further comprising means for connecting said tool with said base member.

9. A device as defined in claim 1, wherein said tool is displaceable relative to said base member, said base member having a side surface formed so as to guide said tool during its displacement relative to said base member.

10. A method of producing mating alternating contour surfaces on workpieces, comprises the steps of providing a rotatable and displaceable tool having a alternating contour working surface; arranging on a workpiece a base member which has a first substantially flat surface and a second opposite surface which is spaced transversely from the first surface and has two surface portions which are offset from one another in a transverse direction; and displacing the tool so that it is guided by the base member so as to produce mating alternating contour surfaces in two workpieces.

11. A method as defined in claim 10, wherein said displacing includes placing one of the surface portions on one of the workpieces, placing the other of the surface portions on the other of the two workpieces, and jointly displacing the tool together with the base member relative to the one workpiece and the other workpiece.

12. A method as defined in claim 10, wherein said displacing includes placing the base member with its first surface on one of the two workpieces and on the other of two workpieces, displacing the tool relative to one of the workpieces and relative to the base member with lateral guidance of the tool against a side surface of the base member, and displacing the tool relative to the other workpiece and relative to the base member with guidance of the tool over one of the surface portions of the second surface of the base member.

* * * * *